US006911948B2

(12) United States Patent
Foore et al.

(10) Patent No.: US 6,911,948 B2
(45) Date of Patent: Jun. 28, 2005

(54) ANTENNA STEERING SCHEDULER FOR MOBILE STATION IN WIRELESS LOCAL AREA NETWORK

(75) Inventors: Lawrence R. Foore, Palm Bay, FL (US); Kenneth M. Gainey, Satellite Beach, FL (US)

(73) Assignee: IPR Licensing, Inc., Wilmington, DE (US)

(*) Notice: Subject to any disclaimer, the term of this patent is extended or adjusted under 35 U.S.C. 154(b) by 0 days.

(21) Appl. No.: 10/462,569

(22) Filed: Jun. 16, 2003

(65) Prior Publication Data

US 2004/0145530 A1 Jul. 29, 2004

(Under 37 CFR 1.47)

Related U.S. Application Data

(60) Provisional application No. 60/389,477, filed on Jun. 17, 2002.

(51) Int. Cl.[7] ............................ H01Q 19/06; H01Q 3/22
(52) U.S. Cl. ........................ 343/754; 343/853; 342/368
(58) Field of Search ................................. 343/754, 757, 343/853; 342/154, 157, 362, 368, 372, 374; 455/500, 515, 70; H01Q 19/06, 3/22

(56) References Cited

U.S. PATENT DOCUMENTS

| 5,767,807 | A | * | 6/1998 | Pritchett ..................... 342/374 |
| 5,907,794 | A | * | 5/1999 | Lehmusto et al. ......... 455/11.1 |
| 6,163,597 | A | * | 12/2000 | Voit ......................... 379/93.17 |
| 6,195,045 | B1 | * | 2/2001 | Xu et al. ..................... 342/368 |
| 6,515,635 | B2 | * | 2/2003 | Chiang et al. ............. 343/834 |
| 2003/0048770 | A1 | * | 3/2003 | Proctor, Jr. ................. 370/349 |
| 2003/0161340 | A1 | * | 8/2003 | Sherman ..................... 370/445 |

* cited by examiner

Primary Examiner—Trinh Vo Dinh
(74) Attorney, Agent, or Firm—Hamilton, Brook, Smith & Reynolds, P.C.

(57) ABSTRACT

Methods of scheduling optimization of communications used with Wireless Local Area Network (WLAN) equipment that employs steerable directional antennas. The methods may use and are compatible with Media Access Control (MAC) layers of IEEE 802.11 group of standards. The methods do not depend on any particular PHY layer standard.

9 Claims, 3 Drawing Sheets

US 6,911,948 B2

ANTENNA STEERING SCHEDULER FOR MOBILE STATION IN WIRELESS LOCAL AREA NETWORK

RELATED APPLICATION

This application claims the benefit of U.S. Provisional Application No. 60/389,477 filed on Jun. 17, 2002. The entire teachings of the above application are incorporated herein by reference.

BACKGROUND OF THE INVENTION

Wireless data communication equipment, such as Wireless Local Area Network (WLAN) devices, are finding widespread use in personal computer applications. They have become relatively inexpensive to deploy, finding economical use even in home computer networks.

The technology supporting the Institute of Electrical and Electronics Engineers (IEEE) 802.11 standards and other similar networking standards allows stations (STAs), e.g., portable computers, to be mobile while remaining connected to a WLAN via radio or infrared communications to access points (APs) or other STAs. These standards are designed as several layers of communication protocols. A physical layer (PHY) in the STAs provides low-level transmission means by which the STAs communicate. Above the PHY is a Media Access Control layer (MAC) that provides services, such as authentication, de-authentication, privacy, association, disassociation, etc.

Typically PHY electromagnetic signals are transmitted and received at a STA by a monopole antenna. This type of antenna typically consists of a single wire or patch antenna element. The signal transmitted from a monopole antenna is omni-directional in nature. That is, the signal is sent with the same signal strength in all directions in a generally horizontal plane for a vertical oriented antenna element. Reception of a signal with a monopole antenna element is likewise omni-directional. A monopole antenna thus does not differentiate in its ability to detect a signal in one direction versus detection of the same or a different signal coming from another direction.

Monopole antennas are susceptible to effects that degrade the quality of communication between the STAs and APs, such as reflection or diffraction of radio wave signals caused by intervening objects, such as walls, desks, people, etc. These objects create multi-path, normal statistical fading, Rayleigh fading, and so forth.

Steerable directional antennas, i.e. antennas optimized for communications in a particular direction in space, may improve signal reception when used within the STAs and increase the allowable distance between STAs and APs. Such antennas are known in the prior art.

For example, U.S. Pat. No. 6,404,386 issued to Proctor, Jr., et al. on Jun. 11, 2002, entitled "Adaptive Antenna for Use in Same Frequency Networks", incorporated by reference herein in its entirety, describes a directional subscriber antenna apparatus. The antenna provides a plurality of antenna elements, each coupled to a respective signal control component such as a switch. The antenna array creates a beamformer for signals to be transmitted from the subscriber unit, and a directional receiving array to more optimally detect and receive signals transmitted from the base station. By directionally receiving and transmitting signals, multi-path fading is greatly reduced. Various techniques for determining the proper arrangement of signal control components for each antenna element are accommodated with this design.

U.S. Pat. No. 6,396,456 issued to Chiang, et al. on May 28, 2002, entitled "Stacked Dipole Antenna for Use in Wireless Communications Systems", is also incorporated by reference herein in its entirety. This patent describes a dipole antenna element fabricated with printed circuit board (PCB) photo-etching techniques for precise control of the printed structure to mass-produce antenna elements with repeatable features. The antenna includes a planar substrate made of dielectric material, and can be used to fabricate inexpensive steerable antenna arrays.

A detailed discussion of a directive antenna array is provided in U.S. Patent Publication No. 2002/0008672, published Jan. 24, 2002, entitled "Adaptive Antenna for Use in Wireless Communications System", the entire teachings of which are incorporated herein by reference. Example methods for optimizing antenna direction based on received or transmitted signals by the directive antenna array are also discussed therein and incorporated herein by reference in their entirety.

SUMMARY OF THE INVENTION

Embodiments of present invention include methods and devices for controlling a directional antenna used by a wireless data network subscriber station having a virtual carrier sense state and a physical carrier sense state, the antenna operable in an omni-directional mode, in a directional mode, and in an optimization steering mode. Embodiments of this invention also may comprise a computation device. The operation of embodiments of this invention may comprise determining the virtual carrier sense state, determining the physical carrier sense state, comparing the virtual carrier sense state and the physical carrier sense state, and if the virtual carrier sense state and the physical carrier sense state do not concur, then operating the antenna in the omni-directional mode. The operation of embodiments of this invention may also comprise selecting a preferred source identifier, determining the subscriber station identifier, receiving a frame having a source identifier and a destination identifier, determining the virtual carrier sense state, determining the physical carrier sense state, comparing the virtual carrier sense state and the physical carrier sense state, and if the virtual carrier sense state and the physical carrier sense state concur, the source identifier is the preferred source identifier, and the destination identifier is not the subscriber station identifier, then operating the antenna in the optimization steering mode.

The operation of the embodiments of this invention may also comprise if the virtual carrier sense state and the physical carrier sense state do not concur, then operating the antenna in the omni-directional mode. The operation of embodiments of this invention may also comprise receiving at least one additional frame while operating the antenna in the optimization steering mode.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
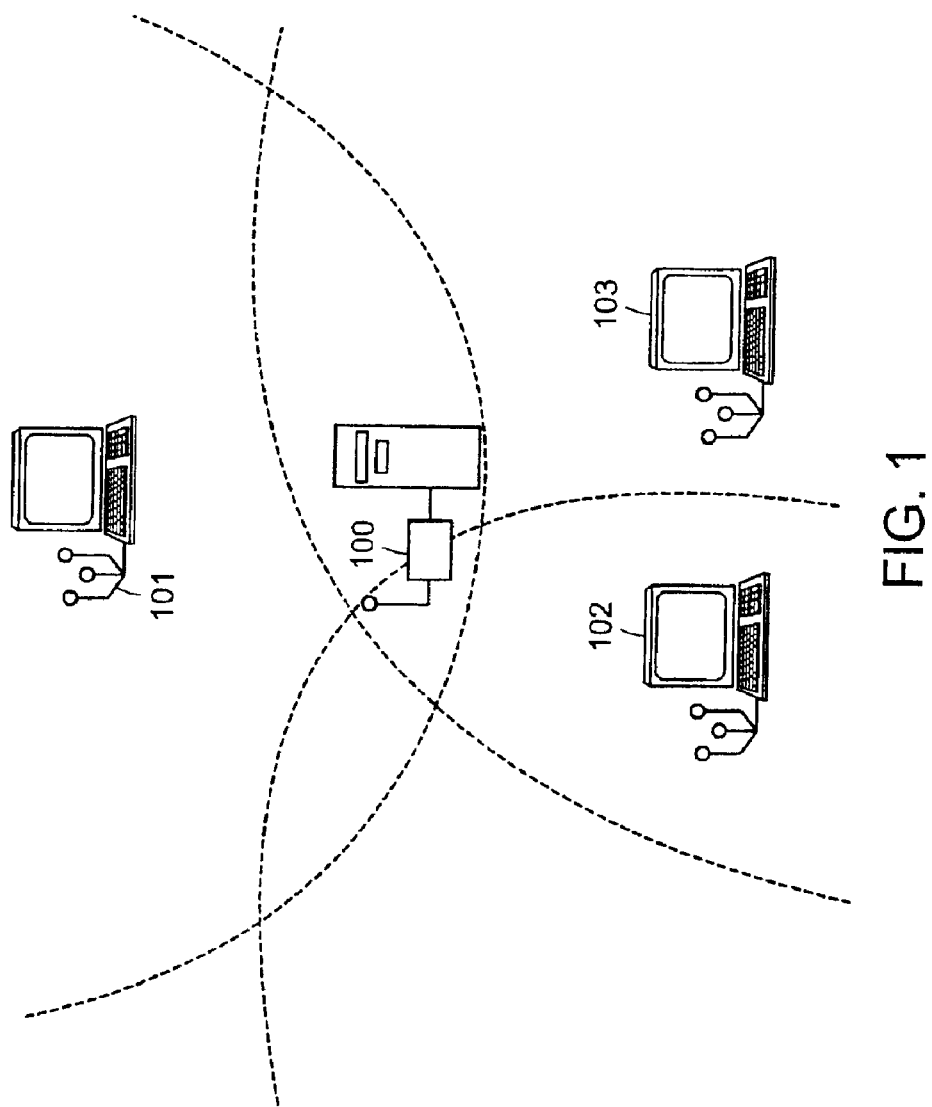
FIG. 1 is a schematic illustration of a wireless network.

A description of preferred embodiments of the invention follows.

Some embodiments of the present invention use steerable directional antennas, which are known in the pertinent art. This is evidenced, in particular, by the patent documents mentioned above in the Background section of this application. The following describes the aspects of the directional antenna technology pertinent to this invention.

A steerable directional antenna for the purposes of this invention is a device with the following properties. It may be set to operate in one of two modes: an omni-directional mode or a directional mode. A controlling device to which the antenna is connected controls the mode the antenna is set at any instant in time. While in omni-directional mode, the antenna is not substantially optimized for communications in any direction. While in the directional mode, it has two properties: (a) the communications using such antenna for some directions are more optimal then for others, and (b) the controlling device may change this direction or directions without the device being moved. Note that these features are not tied to any part of the electromagnetic spectrum, i.e. the antenna's operating range does not necessarily have to be within the radio frequency band. Note also that a steerable directional antenna may in fact consist of multiple antenna elements.

A steerable directional antenna may be operated to determine which direction to choose to optimize its functioning in the directional mode under current conditions. For example, it may measure how the relative quality of reception of a signal arriving from a given source varies depending on the antenna's direction. In this manner it is possible to choose the antenna's direction for its optimal functioning in the directional mode. Such a mode of operation of the antenna is called optimization steering and the antenna performing the optimization steering is said to be in an optimization steering mode. Note that the optimization steering may be implemented, for example, as a series of measurements of relative signal strength for different directions of antenna in directional mode. Note also that implementation of the optimization steering mode for a steerable directional antenna does not require any additional antenna features. The details and strategy of optimization steering are not pertinent to the present invention.

Some embodiments of the present invention use various embodiments of the ANSI/IEEE 802.11 Wireless LAN standard and related standards, and specifically the MAC layer, as defined by these standards (hereinafter, 802.11 MAC protocol). These standards are known in the pertinent art. The following describes the aspects of these standards pertinent to this invention. It should be understood, however, that other wireless equipment operating with other protocols may also be used.

The 802.11 standards are grounded in the notion of wireless medium (WM) or simply medium, which they define as the medium used to implement the transfer of protocol data units (PDUs) between peer physical layer (PHY) entities of a wireless local area network (LAN). In practical terms, these PDU are transmitted via electromagnetic waves over the air. The common frequency ranges for such transmission are the Radio Frequency (RF) and Infrared Frequency (IR) bands.

The physical layer entities are classified as stations and access points. A station (STA) is any device containing an IEEE 802.11 conformant Medium Access Control (MAC) and PHY interface to the wireless medium. A typical STA is implemented as a computer, but other devices, such as handheld devices, portable digital assistants (PDA), and cellular mobile telephones may be used. An access point (AP) is any entity that has station functionality and provides access to the distribution services, i.e. the LAN functionality, for associated STAs via the wireless medium. An AP usually incorporates a stationary transceiver. It must be understood that an AP is also a STA. The STAa that are not APs are usually portable computers and similar devices.

FIG. 1 illustrates this arrangement. STAs 101, 102, and 103 are portable laptop or handheld computer devices. Each STA 101, 102, or 103 is with range of AP 100.

An integral part of these standards are physical and virtual carrier-sense functions, which are used to determine the state of the medium. When either function indicates a busy medium, the medium is considered busy; otherwise, it is considered idle.

The physical carrier-sense mechanism depends on the PHY informing the MAC whether the medium is busy or idle. The actual determination depends on the PHY implementation. PHY implementations are known in the pertinent art and their details are not pertinent to this invention.

A virtual carrier-sense mechanism is achieved by distributing reservation information announcing the impending use of the medium. It is implemented within the MAC. The exchange of RTS (ready to send) and CTS (clear to send) frames prior to the actual data frame is one means of distribution of this medium reservation information. The RTS and CTS frames contain a Duration/ID field that defines the period of time that the medium is to be reserved to transmit the actual data frame and the returning ACK (acknowledgement) frame. All STAs within the reception range of either the originating STA (which transmits the RTS) or the destination STA (which transmits the CTS) learn of the medium reservation.

Thus a STA may be unable to receive from the originating STA, yet still know about the impending use of the medium to transmit a data frame. This is important, for example, because while a STA is in communication with an AP, i.e. within its transmission range, it may not necessarily be within the transmission range of another STA using the same AP. FIG. 1 schematically shows such a situation. Here the AP 100 is within range of all three STAs 101, 102, and 103, but STAs 102 and 103 are out of range of STA 101.

A network allocation vector (NAV) on each STA maintains a prediction of future traffic on the medium based on duration information that is announced in RTS/CTS frames prior to the actual exchange of data. The carrier-sense mechanism combines the NAV state and the STA's transmitter status with physical carrier sense to determine the busy/idle state of the medium. The NAV may be thought of as a counter, which counts down to zero at a uniform rate. When the counter is zero, the virtual carrier-sense indication is that the medium is idle; when nonzero, the indication is busy. The medium is defined as busy whenever the STA is transmitting.

Every STA operating under 802.11 MAC protocol at any time can use two variables: one indicating the physical carrier state (which is used in the Boolean sense) and the other indicating the virtual carrier sense state and the duration of such state (which is either zero or a positive number).

Another important feature of 802.11 MAC protocol is that every MAC frame received by a STA contains an indicator of its source and its destination and also of the length of the frame.

Some embodiments implemented on STAs also rely on two additional variables: their own STA identifier (ID) and an ID of the preferred AP, i.e. the preferred source.

Some embodiments of this invention implemented on STAs use steerable directional antennas controllable by such STAs. They use such antennas for communications with other STAs, including APs. The optimization of communications performed in such embodiments essentially consists of steering of the antenna's preferred direction within a STA in the direction of its preferred AP.

Figure 2:
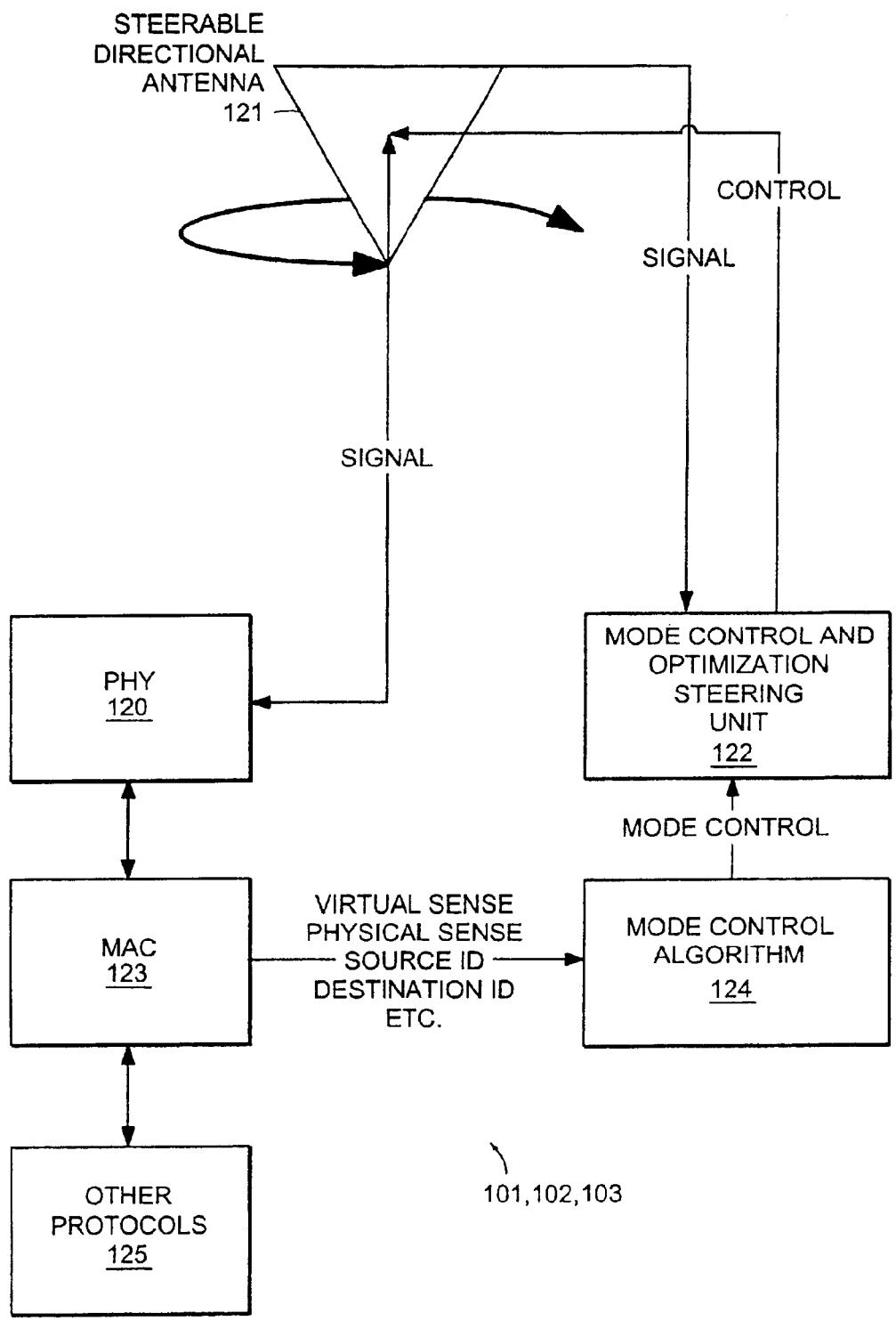
FIG. 2 is a schematic diagram of the structure of a STA using an embodiment of this invention.

FIG. 2 illustrates the functioning of a STA using an embodiment of this invention. The arrangement of antenna array 121, PHY 120, MAC 123, and other protocols 125 is unaffected by the presence of an embodiment of this invention, i.e. the STA remains IEEE 802.11 conformant. For example, more details of preferred embodiment of a multi-element antenna array 121 and how it is steerable can be found in patent applications referenced above. A mode control algorithm 124, being a part of the embodiment, relies on MAC 123 to provide it with data, as further explained below. The mode control algorithm 124 controls the mode control and optimization unit 122 putting it into one of three modes: directional, omni directional, and optimization steering mode, the nature of which is outlined above. Internal functioning of the mode control and optimization unit 122 is not pertinent to this invention.

Figure 3:
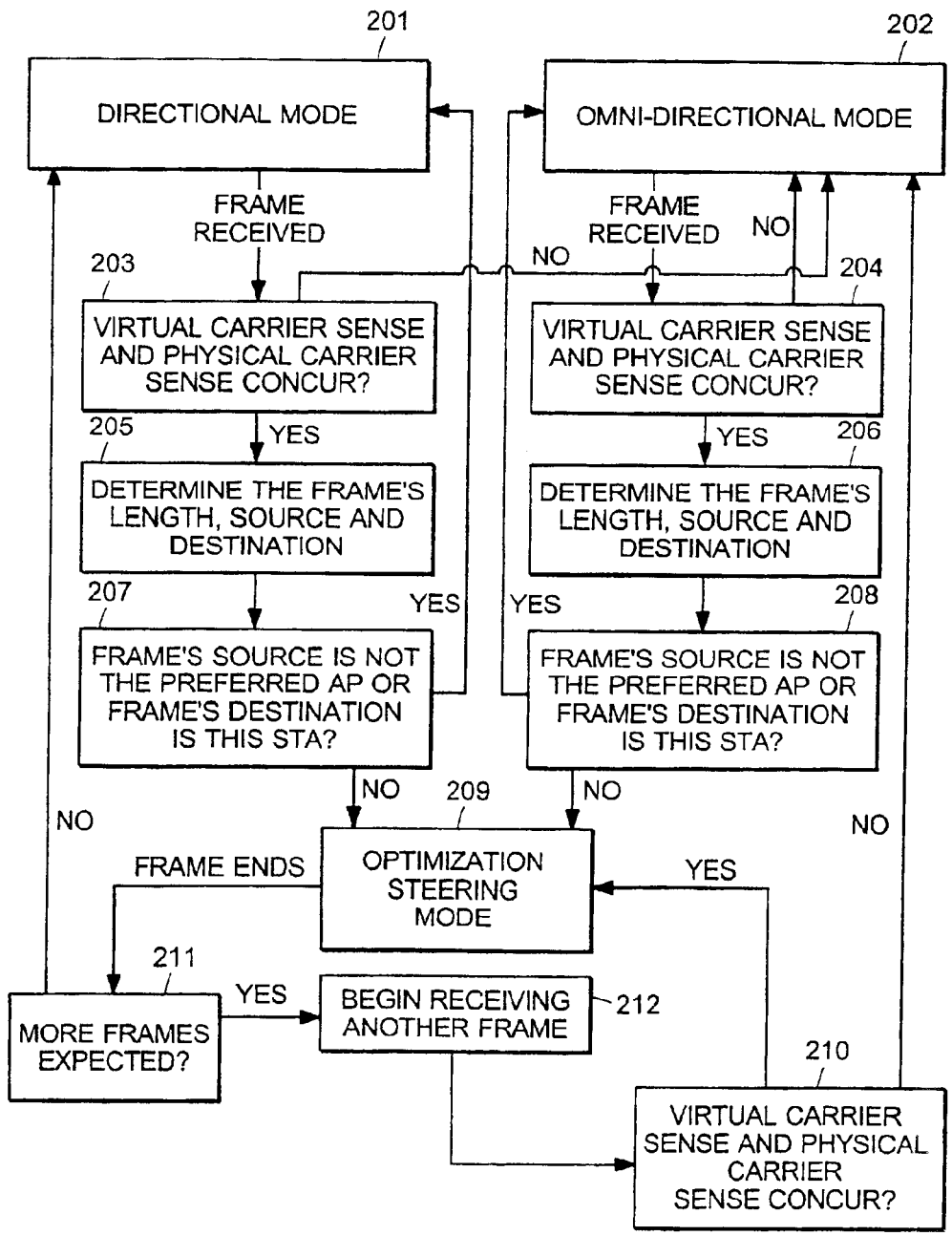
FIG. 3 is a flow diagram of a steering algorithm implemented according to the invention.

One embodiment of this invention determines whether a STA antenna must be in the omni-directional mode, directional mode, or in the optimization steering mode, i.e. steering to orient itself for optimal configuration with respect to its preferred AP. This determination is accomplished in the following way (also shown as a flowchart in FIG. 3).

The STA first chooses a preferred AP.

While its antenna is in the omni-directional mode 202 or directional mode 201, the STA monitors the medium. When it begins receiving a MAC frame, the STA checks whether the virtual and the physical carrier sense concur, in states 204 or 203.

If one is busy and another is idle, or vice versa, then the STA's antenna is put into the omni-directional mode 202 and the STA awaits the arrival of the next frame.

Otherwise (i.e. when the virtual and the physical carrier sense do concur) the frame's header is decoded, in states 206 and 205. The frame's source identifier is then compared with the preferred AP's identifier, and the frame's destination identifier is compared with the STA's identifier, in states 208 and 207.

If the source identifier is not the preferred AP's identifier (i.e. the frame is not coming from where the STA would steer toward) or the destination identifier is the STA's identifier (i.e. the frame carries data intended for the STA) the antenna's mode is not changed. It either stays in the omni-directional mode 202 or stays in the directional mode 201 pointing to the direction where it was steered earlier.

If the source identifier is the preferred AP's identifier (i.e. the frame is coming from where the STA would steer toward) and the destination identifier is the STA's identifier (i.e. the frame does not carry data intended for the STA) the antenna is placed into the optimization steering mode 209 for one or several frames' duration. This expected duration may be the expected length of the transmitted frame (determined when the frame's header is decoded) or the expected duration of transmission determined by the value of the NAV counter. It stays in the optimization steering mode 209 until one of the two events takes place: either (a) the transmission ends normally at the expected moment, in which case the antenna stays in the directional mode 201 pointing to the direction chosen during the optimization steering, or (b) upon arrival of a frame 212, the virtual and the physical carrier sense no longer concur 210, in which case the antenna is put into the omni-directional mode 202 and the STA awaits the arrival of the next frame.

When the antenna is in the optimization steering mode 209, its direction may be changed using the incoming signal from the preferred AP for optimization of the communications with the preferred AP.

Note that the above algorithm is equally compatible with any kind of PHY layer capable of supporting the necessary features of the MAC layer. In particular, the communications may take place over any part of electromagnetic spectrum.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for controlling a directional antenna used by a wireless data network subscriber station having a subscriber station identifier, a virtual carrier sense state, and a physical carrier sense state, the antenna operable in an omni-directional mode and in an optimization steering mode, comprising the steps of:

selecting a preferred source identifier;

determining the subscriber station identifier;

receiving a frame having a source identifier and a destination identifier;

determining the virtual carrier sense state;

determining the physical carrier sense state;

comparing the virtual carrier sense state and the physical carrier sense state; and if the virtual carrier sense state and the physical carrier sense state concur, the source identifier is the preferred source identifier, and the destination identifier is not the subscriber station identifier, then operating the antenna in the optimization steering mode.

2. The method of claim 1 further comprising if the virtual carrier sense state and the physical carrier sense state do not concur, then operating the antenna in the omni-directional mode.

3. The method of claim 1 further comprising ending the operating of the antenna in the optimization steering mode after the frame is entirely received.

4. The method of claim 1 further comprising receiving at least one additional frame while operating the antenna in the optimization steering mode.

5. The method of claim 4 further comprising ending the operating of the antenna in the optimization steering mode after the last additional frame is entirely received.

6. The method of claim 1 further comprising if the virtual carrier sense state and the physical carrier sense state do not concur, ending operating the antenna in the optimization steering mode.

7. The method of claim 1 further comprising if the antenna is operated in the optimization steering mode and the virtual carrier sense state and the physical carrier sense state do not concur, operating the antenna in an omni-directional mode.

8. The method of claim 1 wherein the preferred source identifier is an access point.

9. A wireless data network subscriber station having a subscriber station identifier, a virtual carrier sense state, and a physical carrier sense state comprising:

an antenna operable in an omni-directional mode and in an optimization steering mode, and a computation device, the computation device processing a received frame and operating the antenna in the optimization steering mode if the virtual carrier sense state and the physical carrier sense state concur, a source identifier is a preferred source identifier, and a destination identifier is not the subscriber station identifier.

* * * * *